(12) United States Patent
Uehara et al.

(10) Patent No.: US 6,994,438 B2
(45) Date of Patent: Feb. 7, 2006

(54) OPTICAL COMPONENT CASING, OPTICAL DEVICE AND PROJECTOR

(75) Inventors: Taisuke Uehara, Chino (JP); Tomiyoshi Ushiyama, Minowa-machi (JP); Shohei Fujisawa, Matsumoto (JP); Hirotatsu Okubo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/740,492

(22) Filed: Dec. 22, 2003

(65) Prior Publication Data

US 2004/0150800 A1    Aug. 5, 2004

(30) Foreign Application Priority Data

Dec. 24, 2002    (JP)    ............................. 2002-373203

(51) Int. Cl.
  G03B 21/28    (2006.01)
  G02F 1/1335    (2006.01)
  G02B 26/08    (2006.01)
  G02B 27/14    (2006.01)
  G02B 7/182    (2006.01)

(52) U.S. Cl. .......................... 353/119; 353/37; 353/84; 353/99; 348/742; 348/782; 348/785; 349/8; 349/113; 359/584; 359/633; 359/634; 359/862; 359/874; 359/875; 359/876

(58) Field of Classification Search ................ 353/119, 353/20, 30, 31, 33, 34, 37, 38, 57, 66, 74, 353/78, 81, 82, 94, 97–99, 84; 348/739, 348/744, 750, 751, 756–759, 766, 771, 781, 348/782, 825, 828, 742, 785, 786; 349/5, 349/7, 8, 25, 30, 37, 113; 362/293, 362; 359/197, 212, 214, 220, 237, 449, 515, 528, 359/543, 578, 584, 633, 634, 730, 838, 839, 359/849, 850, 862, 872–876

See application file for complete search history.

(56) References Cited

U.S. PATENT DOCUMENTS

| | | | | |
|---|---|---|---|---|
| 5,182,676 | A | * | 1/1993 | Iwai et al. ................... 359/841 |
| 5,865,521 | A | * | 2/1999 | Hashizume et al. .......... 353/38 |
| 2002/0140909 | A1 | | 10/2002 | Tanaka ........................ 353/70 |
| 2002/0186352 | A1 | * | 12/2002 | Chen et al. ................... 353/98 |

FOREIGN PATENT DOCUMENTS

| | | |
|---|---|---|
| JP | A 8-304739 | 11/1996 |
| JP | A 2002-287252 | 10/2002 |

* cited by examiner

*Primary Examiner*—W. B. Perkey
*Assistant Examiner*—Rochelle Blackman
(74) *Attorney, Agent, or Firm*—Oliff & Berridge, PLC

(57) ABSTRACT

An optical component casing (40) that houses a plurality of optical components including a reflection mirror (424) and disposes the plurality of optical components on a planarly defined illumination optical axis (L1) has a holder (81) that holds the reflection mirror (424) and a housing main body (401) that houses the other optical components. A bulging portion (816) bulging in an out-plane direction of the reflection mirror (424) is formed on a side of the holder (81) opposite to the side on which the reflection mirror (424) is attached, the bulging portion (816) pivotally moving on the inner surface of the housing main body (401) to rotate the holder (81) relative to the housing main body (401), where a rotation center (P) of the holder (81) is substantially coincident with an intersecting point (Q) of the illumination optical axis (L1) and a reflection surface (424A) of the reflection mirror (424).

11 Claims, 12 Drawing Sheets

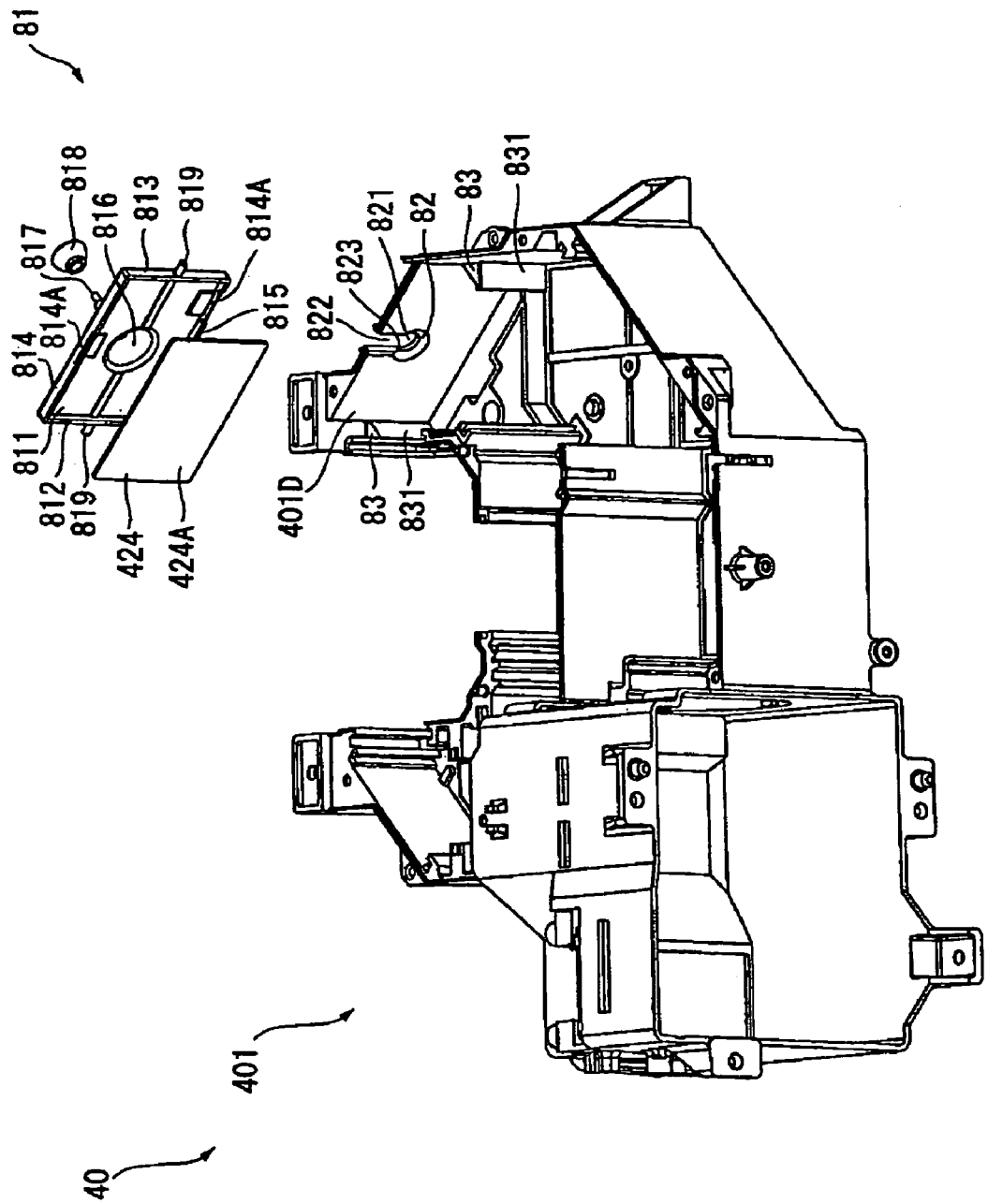

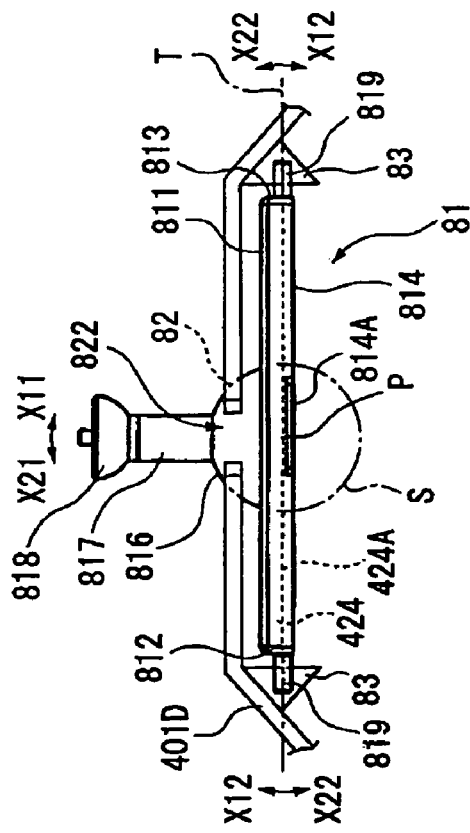
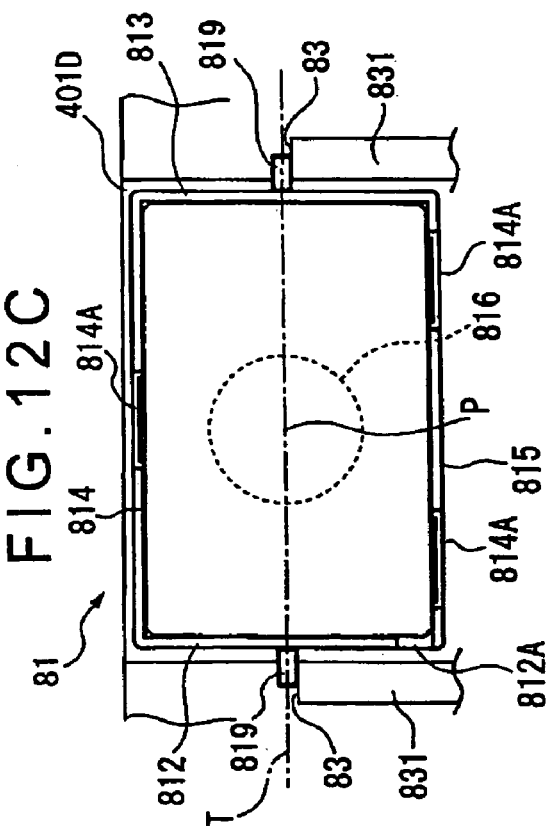
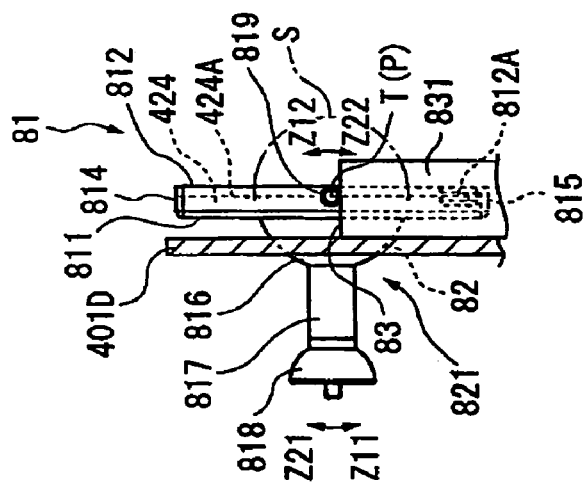

OPTICAL COMPONENT CASING, OPTICAL DEVICE AND PROJECTOR

BACKGROUND OF THE INVENTION

1. Field of the Invention

The present invention relates to an optical component casing, an optical device and a projector capable of adjusting an attitude of a reflection mirror.

2. Description of Related Art

Conventionally, so-called three-plate projectors have been used, where a light beam irradiated by a light source is separated into three color lights of red, green and blue by a dichroic mirror, the separated color lights being respectively modulated by three liquid crystal panels in accordance with image data, and the modulated light beam is synthesized by a cross dichroic prism and a color image is enlarged and projected on a screen (see Japanese Patent Laid-Open Publication No. 2002-287252, [0026]-[0040], FIGS. 4 and 7).

Such projectors are provided with a plurality of reflection mirrors for reflecting the light beam irradiated by the light source lamp and the color lights separated by the dichroic mirror and introducing the light beam on the liquid crystal panel.

However, when the reflection mirrors are attached at a position shifted relative to a predesigned position, the illumination optical axis of the light beam irradiated by the reflection mirror is likely to be shifted from a desired position.

In the above case, since the light beam of the respective color lights is not effectively introduced on the liquid crystal panel, the illuminance may be deteriorated or a shadow is displayed on a screen.

Further, the effective illumination area on which the respective color lights are effectively synthesized may be narrowed to generate color shadings and a part of the incident light may not be used for projecting the image.

SUMMARY OF THE INVENTION

An object of the present invention is to provide an optical component casing, an optical device and a projector capable of easily and accurately adjusting the illumination optical axis of the light beam irradiated by a reflection mirror.

An optical component casing according to an aspect of the present invention houses a plurality of optical components including a reflection mirror and disposes the plurality of optical components on a planarly defined illumination optical axis, the casing including: a holder that holds the reflection mirror; a housing main body that houses the optical components other than the reflection mirror, and a bulging portion bulging in an out-plane direction of the reflection mirror, the bulging portion being provided on a side of the holder opposite to a side on which the reflection mirror is provided, in which the bulging portion pivotally moves on an inner surface of the housing main body to rotate the holder relative to the housing main body, and the rotation center of the holder is substantially coincident with the intersecting point of the illumination optical axis and a reflection surface of the reflection mirror.

According to the above aspect of the present invention, since the bulging portion bulging in the out-plane direction of the reflection mirror is formed on the side of the holder opposite to the side on which the reflection mirror is provided and the holder is rotated by pivotally moving the bulging portion on the inner surface of the housing main body, the rotation center of the holder being substantially coincident with the intersecting point of the illumination optical axis and the reflection surface of the reflection mirror, the displacement of the illumination optical axis of the light beam irradiated by the reflection mirror (referred to as an irradiation light beam illumination optical axis hereinafter) when the holder is rotated by a predetermined angle while the light beam is incident on the reflection mirror along the illumination optical axis becomes smaller than an arrangement where the rotation center holder is not substantially coincident with the intersecting point of the illumination optical axis and the reflection surface.

Accordingly, the irradiation light illumination optical axis can be easily and accurately adjusted.

In the above aspect of the present invention, the bulging portion may preferably be defined as a part of a sphere and the rotation center of the holder may preferably be substantially coincident with the center of the sphere.

According to the above arrangement, since the bulging portion is formed as the part of the sphere and the center of the sphere is substantially coincident with the rotation center of the holder, the bulging portion can be smoothly pivoted on the inner surface of the housing main body.

Accordingly, the irradiation light illumination optical axis can be more accurately adjusted since the holder can be smoothly rotated.

In the above aspect of the present invention, a recess may preferably be formed on the inner surface of the housing main body at a position corresponding to the pivoting surface of the bulging portion.

According to the above arrangement, since the recess is formed at the position corresponding to the pivoting surface of the bulging portion on the inner surface of the housing main body, the position of the bulging portion can be determined relative to the inner surface of the housing main body by engaging the bulging portion with the recess.

Accordingly, the position shift of the rotation center when the holder is rotated can be restrained as compared to an arrangement without the recess.

In the above aspect of the present invention, an arm projecting in the out-plane direction of the holder may preferably be provided on the top of the bulging portion, and a hole that receives the projection of the arm may preferably be formed on the housing main body.

According to the above arrangement, since the arm projecting in the out-plane direction of the holder is provided on the top of the bulging portion and a hole for receiving the projection of the arm is formed on the housing main body, the bulging portion can be pivotally moved from the outside, in other words, the holder can be rotated even after the housing main body is closed with a cover.

Accordingly, the holder can be rotated without providing any special dust-proof measures for the optical components housed in the housing main body.

In the above aspect of the present invention, a pair of projections projecting along a surface of the reflection mirror may preferably be provided on both ends of the holder orthogonal to a plane including the illumination optical axis, the pair of projections may preferably be formed at a position where a line connecting the central axes of the projections passes the rotation center of the holder, and a support surface that supports the pair of projections so that the rotation center of the holder is located on a plane including the illumination optical axis may preferably be provided on the inner surface of the housing main body.

According to the above arrangement, since the pair of projections projecting along the surface of the reflection mirror so that the line connecting the central axes of the respective projections passes the rotation center of the holder are provided on the ends of the holder orthogonal to a plane including the illumination optical axis and the support surface for supporting the projections so that the rotation center of the holder is located on a plane including the illumination optical axis is formed on the inner surface of the housing main body, when the holder is rotated in right and left directions, the projection is slid on the support surface around the rotation center and, when the holder is vertically rotated, the projection is turned on the support surface around the central axis.

Accordingly, by providing the projection and the support surface, the downward shift of the rotation center on account of the self-weight of the holder can be trained as compared to an arrangement without the projection and the support surface.

Further, by supporting the projection on the support surface, the holder can be temporarily set inside the housing main body. Accordingly, the installation process and the attitude-adjusting process of the holder can be independently conducted, so that the attitude adjusting process can be efficiently conducted.

An optical device according to another aspect of the present invention separates a light beam irradiated by a light source into a plurality of color lights, the optical device including: the above optical component casing; and a plurality of mirrors housed in the optical component casing, in which the plurality of mirrors includes a total reflection mirror that reflects all of the light and a wavelength-selection mirror that transmits a light of a predetermined wavelength and reflects the rest of the light, and the total reflection mirror or the wavelength-selection mirror is attached to the holder.

According to the above aspect of the present invention, the same effect and advantages as the above-described optical component casing can be obtained, and the light beam irradiated by the light source can be securely separated into a plurality of color lights.

A projector according to still another aspect of the present invention modulates a light beam irradiated by a light source in accordance with image information to form an optical image, the optical image being projected in an enlarged manner, the projector having the above optical device.

According to the above aspect of the present invention, the same effect and advantages as the above-described optical device can be obtained, and a high illuminance and high quality optical image can be projected in an enlarged manner.

BRIEF DESCRIPTION OF THE DRAWINGS

FIG. 11 is a exploded perspective view showing the structure of the light guide housing the optical unit of the aforesaid embodiment; and FIG. 12 is an orthographic view showing three aspects of an attitude-adjusting structure of a reflection mirror of the aforesaid embodiment.

DETAILED DESCRIPTION OF PREFERRED EMBODIMENT(S)

An embodiment of the present invention will be described below with reference to the attached drawings.

(1) Exterior Arrangement

Figure 1:
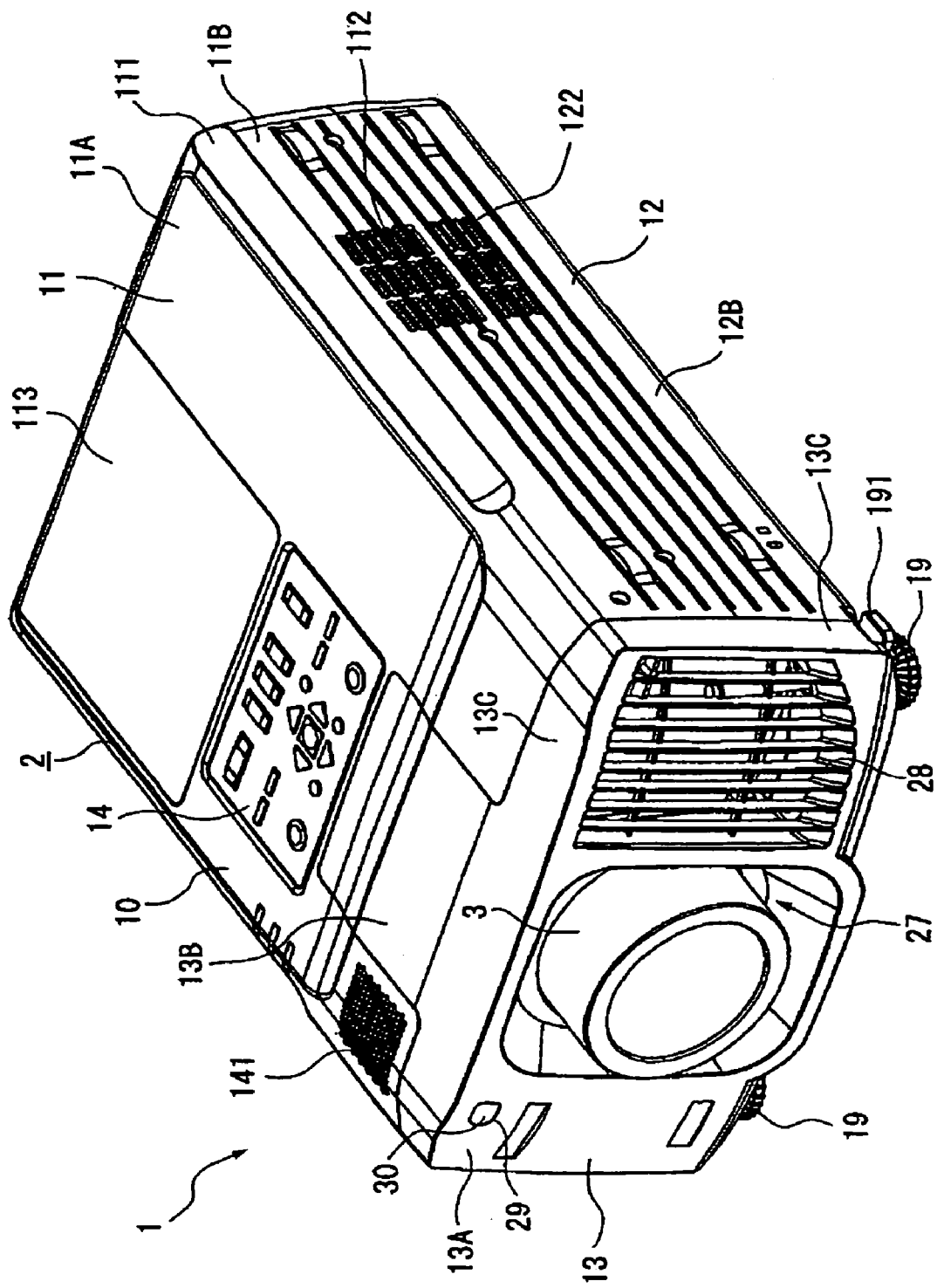
FIG. 1 is a perspective view showing an exterior arrangement of a projector according to an embodiment of the present invention.
Figure 2:
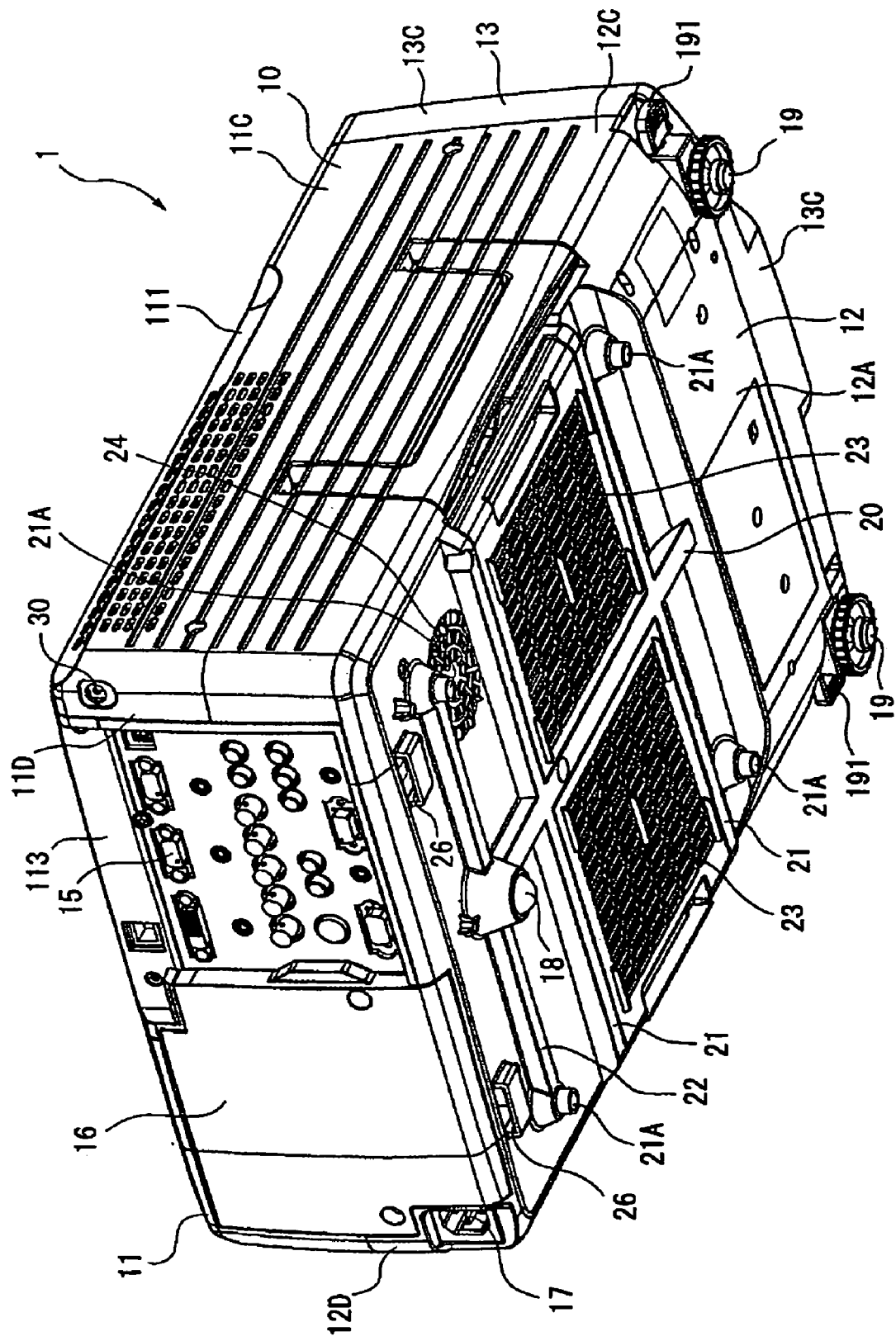
FIG. 2 is a perspective view showing the exterior arrangement of the projector of the aforesaid embodiment.

FIGS. 1 and 2 show a projector 1 according to an embodiment of the present invention, where FIG. 1 is a perspective view showing the projector 1 from the upper font side and FIG. 2 is another perspective view showing the projector 1 from the lower rear side thereof.

The projector 1 is an optical device that modulates a light beam irradiated by a light source in accordance with image information to enlarge and project on a projection surface such as a screen, which includes an exterior case 2 housing an apparatus body including an optical unit (described below) thereinside and a projection lens 3 exposed from the exterior case 2. The projector 1 is installed in large-scale retail stores, public spaces and the like, which provides image information to a large number of viewers by displaying a projection image on a large screen.

The projection lens 3 is a projection optical system that enlarges and projects an optical image formed by modulating a light beam irradiated by a light source by a liquid crystal panel (optical modulator:described below) in accordance with image information, which is constructed as a lens set housing a plurality of lenses in a cylindrical lens barrel.

The exterior case 2 (casing) has a cover 10 that covers the apparatus body that is a rectangular parallelepiped having greater depth along the projection direction than the width orthogonal thereto, and a frame body (not shown) for securing the strength of the casing.

The cover 10 has an upper case 11 covering the upper part of the apparatus body, a lower case 12 covering the lower part of the apparatus body, and a front case 13 covering the front part of the apparatus body. The respective cases 11 to 13 are synthetic-resin-made articles integrally molded by injection molding and the like.

The upper case 11 has an upper side 11A covering the upper part of the apparatus body, lateral sides 11B and 11C extending approximately vertically downward from both ends of the upper side 11A in the width direction, and a rear side 11D extending from the rear end of the upper side 11A.

The ridge line where the upper side 11A and the lateral sides 11B and 11C of the upper case 11 are intersected are chamfered from approximately at the center to the rear end (in the projection direction) of the projector 1 to form a recess 111 dented along the ridge line. The recess 111 is formed to insert a pipe-shaped support member for connecting two projectors 1 when the two projectors 1 are stacked in use.

A slitted opening 112 for introducing a cooing air is formed on the lateral side 11B.

An operation panel 14 for actuating and adjusting the projector 1 is provided approximately at the center of the upper side 11A. The operation panel 14 has a plurality of switches including a power switch and adjustment switches of image and sound, the adjustment switches on the operation panel 14 being operated to adjust the image quality and sound volume and the like when an image is projected by the projector 1.

A plurality of holes 141 are formed on the front side (in projection direction) of the upper side 11A, under which a sound-outputting speaker is housed.

The operation panel 14 and the speaker are electrically connected with a control board of the apparatus body (described below) and an operation signal from the operation panel 14 is processed by the control board.

The rear side 11D is a frame having an opening on the approximately entire side thereof, the opening exposing connectors 15 for the image signal and the like to be inputted and having an opening section for housing a light source adjacent to the connectors 15, the opening section being ordinarily covered with a light-source housing cover 16. Incidentally, the connectors 15 are electrically connected with the below-described control board, and the image signal inputted through the connectors 15 is processed by the control board.

A cover 113 capable of attaching to and detaching from the upper case 11 is attached on the rear end of the upper side 11A and the upper end of the rear side 11D and an extension board such as a LAN board can be inserted inside the cover 113.

The lower case 12 is approximately symmetrical with the upper case 11 around the engaging surface with the upper case 11, which includes a bottom side 12A, lateral sides 12B and 12C and a rear side 12D.

The upper ends of the lateral sides 12B and 12C and the rear side 12D engage with the lower end of the lateral sides 11B and 11C and the rear side 11D of the upper case 11. Incidentally, the rear side 12D has an opening section on the entirety thereof in the same manner as the rear side 11D of the upper case 11, the opening section exposing the above-described connectors 15 after being engaged and the cover 16 being attached extending over the opening sections.

Another opening is formed on the corner of the rear side 12D, from which an inlet connector 17 is exposed. An opening 122 is formed on the lateral side 12B at a position corresponding to the opening 112 formed on the lateral side 11B of the upper case 11.

A fixed leg 18 is provided on the bottom side 12A approximately at the center of the rear end of the projector 1 and adjustment legs 19 are provided on both front ends in width direction.

The adjustment leg 19 is constructed of a shaft member projecting from the bottom side 12A in a manner advanceable and retractable in the out-plane direction, the shaft member being housed inside the exterior case 2. The advancement and retraction of the adjustment leg 19 relative to the bottom side 12A can be adjusted by operating an adjustment button 191 provided on the lateral side of the projector 1.

Accordingly, the vertical position of the projection image irradiated by the projector 1 can be adjusted and the projection image can be formed at an appropriate position.

A convex rib 20 extending approximately at the center of the bottom side 12A along the projection direction and a plurality of ribs 21 and 22 extending orthogonal to the rib 20 along the width direction of the projector 1 are formed on the bottom side 12A. Though described in detail below, an intake opening for drawing in the cooling air from the outside is formed between the two ribs 21 at the middle section, the intake opening being covered with a filter 23. Another intake opening 24 also for drawing in the cooling air is provided on the rear side of the intake opening covered with the filter 23, which, however, is not covered with a filter.

Four screw holes 21A are formed on the ends of the ribs 21 and 22 extending along the width direction of the projector 1. Metal fittings used in suspending the projector 1 from the ceiling are attached to the screw holes 21A.

An engaging portion 26 is formed on the rear end of the bottom side 12A and a cover for covering the connectors 15 to prevent the dust and the like from being adhered thereon is attached on the engaging portion 26.

The front case 13 has a front section 13A and an upper section 13B, and a rib 13C extending in an out-plane direction formed on the outer circumference of the front section 13A, the rib 13C being engaged with the distal end (i.e. projection direction) of the upper case 11 and the lower case 12.

The front section 13A is inclined from the bottom side 12A of the lower case 12 to the upper side 11A of the upper case 11 in a manner to be away from the projection surface. Such an arrangement is for directing the front section 13A of the front case 13 toward the lower side to prevent the adhesion of dust on the front case 13 when the projector 1 is suspended from the ceiling, which is effective in a ceiling-suspending arrangement where maintenance work is more troublesome than a normal setting.

An opening 27 is formed approximately at the center of the front section 13A, and the projection lens 3 is exposed from the opening 27.

A slitted opening 28 is formed adjacent to the opening 27, and the air having cooled the inside of the apparatus body of the projector 1 is discharged from the opening 28.

A hole 29 is formed around the corner of the front section 13A and a light-receiver 30 for receiving an operation signal from a remote controller (not shown) is exposed from the hole 29.

Incidentally, the light-receiver 30 is also provided on the rear side of the projector 1, which is located on the corner of the rear side 11D of the upper case 11 as shown in FIG. 2. Accordingly, the operation signal of the remote controller can be received from both the front side and the rear side of the apparatus.

Though not specifically shown, the upper section 13B extends approximately to the center of the upper side 11A of the upper case 11, which reaches around the base end of the projection lens 3. Such arrangement is for exchanging the projection lens 3 only by detaching the front case 13, where the upper section 13B can be detached by detaching the front case 13 from the upper case 11 and the lower case 12 to expose an attachment portion on the base end of the projection lens 3.

(2) Interior Arrangement

Figure 3:
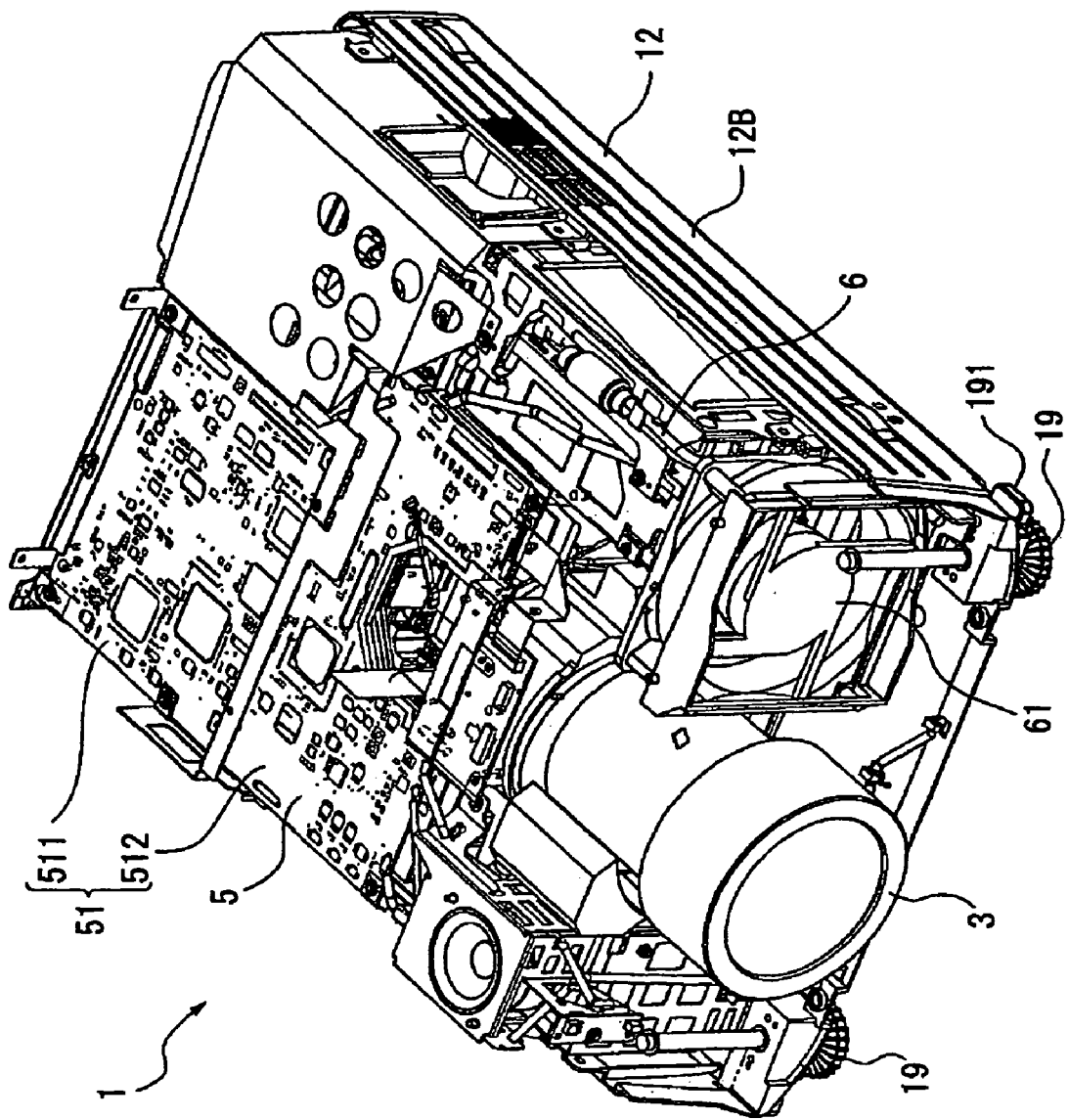
FIG. 3 is a perspective view showing an internal arrangement of the projector of the aforesaid embodiment.
Figure 4:
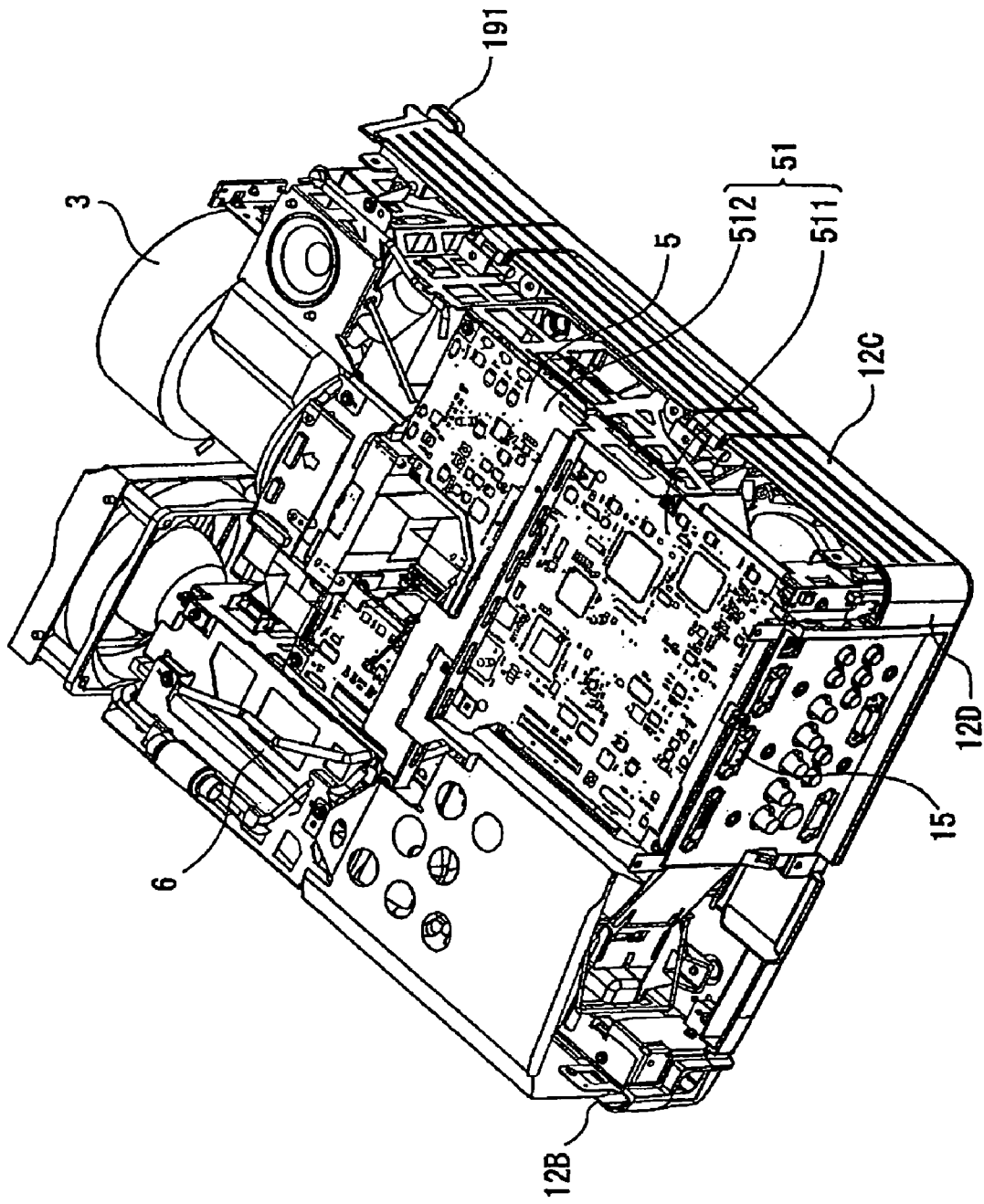
FIG. 4 is a perspective view showing the internal arrangement of the projector of the aforesaid embodiment.
Figure 5:
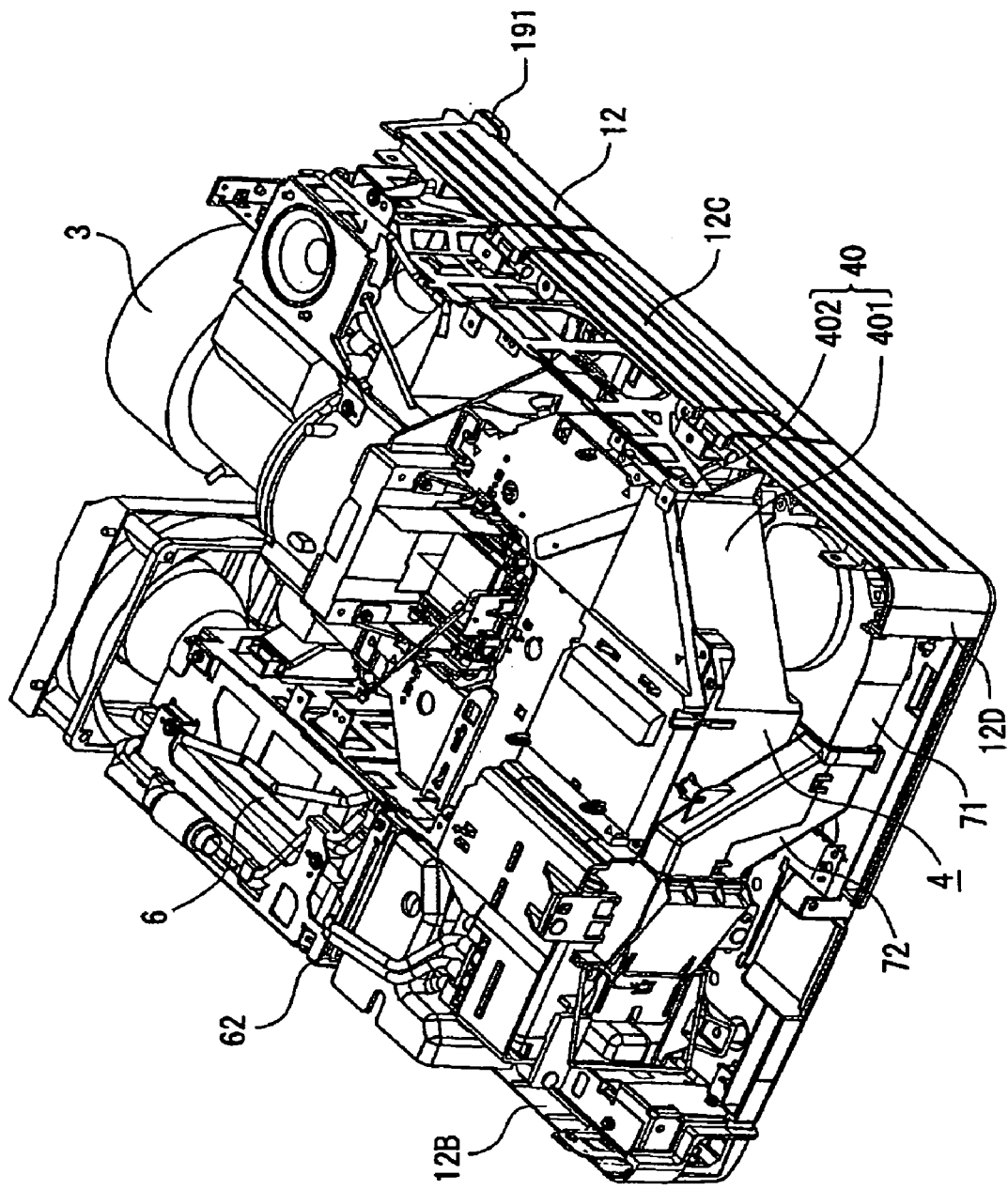
FIG. 5 is a perspective view showing the internal arrangement of the projector of the aforesaid embodiment.

As shown in FIGS. 3 to 5, the apparatus body of the projector 1 is housed inside the exterior case 2, the apparatus body including an optical unit 4, a control board 5 and a power supply block 6.

(2-1) Structure of Optical Unit 4

The optical unit 4 (optical engine) modulates the light beam irradiated by a light source in accordance with image information to form an optical image and forms a projection image on a screen through the projection lens 3, which is installed with a light source and various optical components inside a light guide 40 (optical component casing).

The light guide 40 includes a lower light guide 401 (housing main body) and an upper light guide 402, both being synthetic resin article formed by injection molding and the like.

Figure 6:
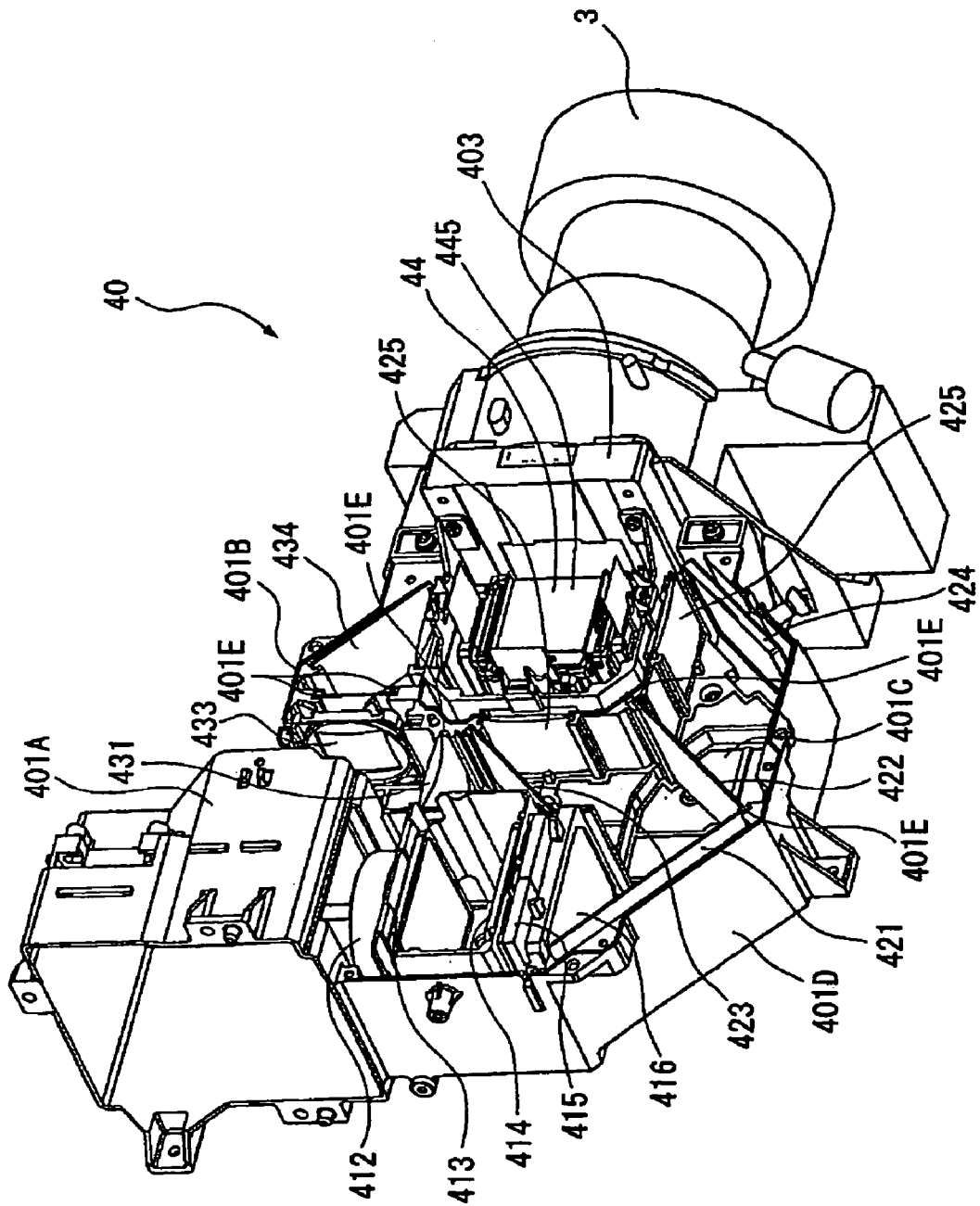
FIG. 6 is a perspective view showing a structure of a light guide housing an optical unit of the aforesaid embodiment.

As shown in FIG. 6, the lower light guide 401 has a light source housing portion 401A for a below-described light source to be housed and a component housing portion 401B for housing optical components, the component housing portion 401B being formed in a container-shape constructed of a bottom portion 401C and a sidewall 401D of which an upper portion is opened, the sidewall 401D being provided with a plurality of grooves 401E. Various optical components of the optical unit 4 are attached to the groove 401E, so that the respective optical components are accurately disposed on an illumination optical axis defined within the light guide 40. The upper light guide 402 has a planar shape corresponding to the lower light guide 401, which is a cover closing the upper side of the lower light guide 401.

An L-sided metal head 403 is disposed on the light-irradiation end of the lower light guide 401, where the below-described optical device 44 is attached to the horizontal section of L-shape of the head 403 and the base end of the projection lens 3 is attached to the vertical section of the L-shape.

Figure 7:
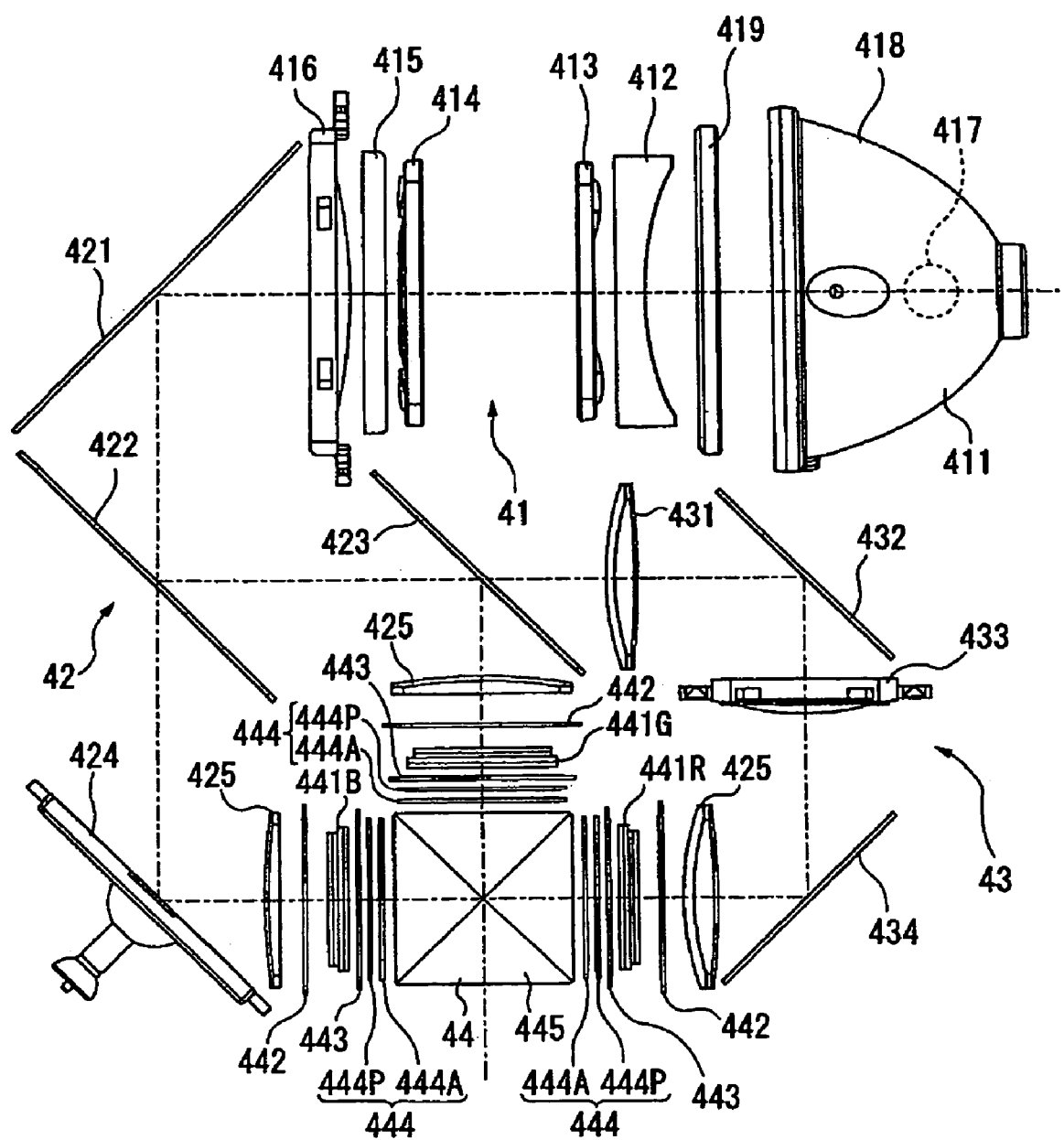
FIG. 7 is a schematic illustration showing a structure of the optical unit of the aforesaid embodiment.

As shown in FIG. 7, the inside of the light guide 40 is functionally separated as an integrator illuminating optical system 41, a color-separating optical system 42, a relay optical system 43 and the optical device 44. Incidentally, the optical unit 4 of the present embodiment is used for a three-plate projector, which is a spatial color-separating optical unit for separating a white light irradiated by the light source into three color lights within the light guide 40.

The integrator illuminating optical system 41 is an optical system for equalizing the illuminance of the light beam irradiated by the light source on a plane orthogonal to the illumination optical axis thereof, which includes a light source 411, a parallelizing concave lens 412, a first lens array 413, a second lens array 414, a polarization converter 415 and a superposing lens 416.

The light source 411 has a light source lamp 417 as a radial light source, a reflector 418 and a front glass 419 covering the light-irradiation side of the reflector 418, where a radial light beam irradiated by the light source lamp 417 is reflected and converted into an approximately parallel light beam by the parallelizing concave lens 412 and the reflector 418 to irradiated toward the outside. A high-pressure mercury lamp is used as the light source lamp 417 in the present embodiment, however, a metal halide lamp and a halogen lamp may alternatively be used. Further, though the parallelizing concave lens 412 is disposed on the irradiation side of the reflector 418 having an ellipsoidal mirror in the present embodiment, a parabolic mirror may be used as the reflector 418.

The first lens array 413 has an arrangement where small lenses having approximately rectangular profile (seen in the illumination optical axis direction) arranged in a matrix. The respective small lenses separate the light beam irradiated by the light source lamp 417 into sub-beams to irradiate in the illumination optical axis direction. The profile of the respective small lenses is arranged approximately similar to the shape of the image formation area of below-described liquid crystal panels 441R, 441G and 441B. For instance, when the aspect ratio (ratio between the horizontal and vertical dimensions) of the liquid crystal panels 441R, 441G and 441B is 4:3, the aspect ratio of the respective small lenses is also set as 4:3.

The second lens array 414 also has the small lenses arranged in a matrix. The small lens array 414 together with the superposing lens 416 superposes the image of the respective small lenses of the first lens array 413 on the liquid crystal panels 441R, 441G and 441B.

The polarization converter 415 converts the light beam from the second lens array 414 into a polarized light of a predetermined direction, which enhances the light utilization efficiency of the optical device 44.

Specifically, the respective sub-beams converted into a single-type polarized light by the polarization converter 415 are substantially superposed on the liquid crystal panels 441R, 441G and 441B by the superposing lens 416. Since the projectors using the liquid crystal panels 441R, 441G and 441B that modulate a polarized light can use only one type of polarized light, approximately half of the light beam from the light source lamp 417 that emits random polarized light cannot be used. Accordingly, with the use of the polarization converter 415, the entire light beam emitted by the light source lamp 417 is converted into a single-type polarized light to enhance the light utilization efficiency of the optical device 44. Incidentally, such polarization converter 415 is disclosed in, for instance, Japanese Patent Laid-Open Publication No. H08-304739.

The color-separating optical system 42 has a reflection mirror 421 that bends the light beam irradiated by the integrator illumination optical system 41, two dichroic mirrors 422 and 423 and a reflection mirror 424, which separates the plurality of sub-beams irradiated by the integrator illuminating optical system 41 into three color lights of red (R), green (G) and blue (B) by the dichroic mirrors 422 and 423. Though described below in detail, the attitude of the reflection mirror 424 can be adjusted relative to the lower light guide 401.

The relay optical system 43 has an incident-side lens 431, a relay lens 433 and reflection mirrors 432 and 434, which introduces the color light (red light) separated by the color-separating optical system 42 toward the liquid crystal panel 441R At this time, the dichroic mirror 422 of the color-separating optical system 42 reflects the red light component and the green light component of the light beam irradiated by the integrator illuminating optical system 41 and transmits the blue light component The blue light transmitted by the dichroic mirror 422 is reflected by the reflection mirror 424 and reaches to the liquid crystal panel 441B for blue color through a field lens 425. The field lens 425 converts the respective sub-beams irradiated by the second lens array 414 into a light beam parallel to the central axis (main beam) thereof. The field lenses 425 provided on the light-incident side of the other liquid crystal panels 441G and 441R works in the same manner.

In the red light and the green light reflected by the dichroic mirror 422, the green light is reflected by the dichroic mirror 423 to reach the liquid crystal panel 441G for green color through the field lens 425. On the other hand, the red light is transmitted through the dichroic mirror 423 and passes the relay optical system 43 to reach the liquid crystal panel 441R for red light through the field lens 425.

Incidentally, the relay optical system 43 is used for the red light in order to prevent the deterioration of the light utilization efficiency on account of light dispersion caused by longer optical path of the red light than the other color light. In other words, the relay optical system 43 is used for directly transmitting the sub-beams incident on the incident-side lens 431 toward the field lens 425. Incidentally, though the red light among the three color lights passes through the relay optical system 43, the blue light may pass through the relay optical system 43, for instance.

The optical device 44 modulates the incident light beam in accordance with image information to form a color image, which includes three incident-side polarization plates 442 on which the respective color lights separated by the color-separating optical system 42 are incident, the liquid crystal panels 441R, 441G and 441B (optical modulator) disposed on the downstream of the respective incident-side polarization plates 442, a visual-angle corrector plate 443 and an irradiation-side polarization plate 444 disposed on the downstream of the respective liquid crystal panels 441R, 441G and 441B, and a cross dichroic prism 445 (color synthesizing optical system).

Figure 8:
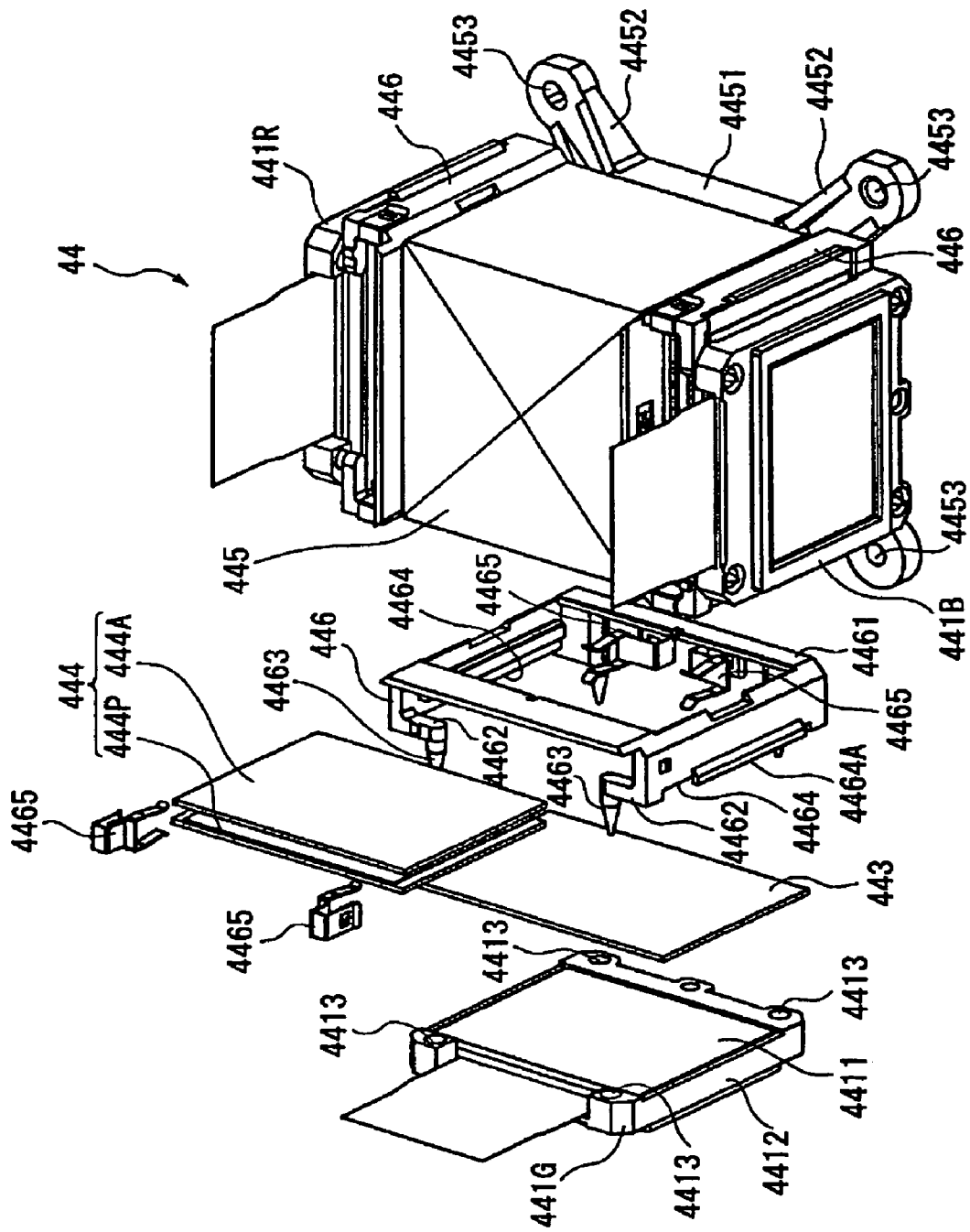
FIG. 8 is a perspective view showing a structure of an optical device of the aforesaid embodiment.

The liquid crystal panels 441R, 441G and 441B uses, for instance, a polycrystalline silicon TFT as a switching element, which includes a panel body 4411 and a holding frame 4412 for housing the panel body 4411 as shown in an example of the liquid crystal panel 441G of FIG. 8. Incidentally, though not specifically commented in the following description, the liquid crystal panels 441R and 441B are arranged approximately the same as the liquid crystal panel 441G.

Though not illustrated, the panel body 4411 has a pair of opposing transparent substrates with liquid crystal being sealed therein, and a dust-proof glass is attached on the incident-side and the irradiation-side of the pair of transparent substrates.

The holding frame 4412 has a recess for housing the panel body 4411, and holes 4413 are formed on four corners thereof.

The incident-side polarization plate 442 disposed on the upstream of the liquid crystal panels 441R, 441G and 441B (see FIG. 7) transmits the polarized light in a predetermined direction among the respective color lights separated by the color-separating optical system 42 and absorbs the other light beam, the incident-side polarization plate 442 having a polarization film being adhered on a substrate such as a sapphire glass. Alternatively, a polarization film may be attached on the field lens 425.

The visual-angle corrector plate 443 has a substrate on which an optical conversion film for correcting the visual-angle of the optical image formed by the liquid crystal panel 441G, the visual-corrector plate 443 decreasing the light leakage on a black screen and greatly enhancing the contrast of the projection image.

The irradiation-side polarization plate 444 transmits a polarized light in a predetermined direction and absorbs the other light beam modulated by the liquid crystal panel 441G, which is constructed of two polarization plates, i.e. a first polarization plate 444P (pre-polarizer) and a second polarization plate 444A (analyzer). The double-plate structure of the irradiation-side polarization plate 444 is for absorbing the incident polarized light respectively by the first polarization plate 444P and the second polarization plate 444A to proportionally distribute the heat generated on the polarization plate 444P and 444A by the polarized light to restrain the overheating of the respective polarization plates.

The cross dichroic prism 445 synthesizes the optical image irradiated by the irradiation-side polarization plate 444 and modulated for each color light to form a color image.

In the cross dichroic prism 445, a dielectric multi-layer film for reflecting red light and another dielectric multi-layer film for reflecting blue light are provided approximately in X-shape along the boundaries of the four right-angle prisms, the dielectric multi-layer films synthesizing the three color lights.

A prism-fixing plate 4451 is fixed on the lower side of the cross dichroic prism 445 by an ultraviolet-curing adhesive. The prism-fixing plate 4451 has legs 4452 extending along the diagonal lines of the cross dichroic prism 445 and a hole 4453 is formed on the distal end of the respective legs 4452.

The optical device 44 is attached on the horizontal section of the L-shaped head 403 by a screw etc. (not shown) inserted to the hole 4453.

The liquid crystal panel 441G, the visual-angle corrector plate 443, the first polarization plate 444P and the second polarization plate 444A are fixed on the light-incident side of the cross dichroic prism 445 through a panel-fixing plate 446.

The panel-fixing plate 446 has a fixing portion body 4461 having an approximately C-shaped cross section, and a pin 4463 projecting on the light-incident side of the fixing portion body 4461 through an arm 4462. On the light-incident side of the fixing portion body 4461, a base 4464 for the visual-angle corrector plate 443 to be fixed and a positioning portion 4464A extending along the light-incident side of the fixing portion body 4461 for defining the outer shape position of the visual-angle corrector plate 443 are formed.

When the liquid crystal panel 441G, the visual-angle corrector plate 443, the first polarization plate 444P and the second polarization plate 444A are fixed on the light-incident side of the cross dichroic prism 445 by the panel-fixing plate 446, the first polarization plate 444P and the second polarization plate 444A are inserted into a space defined by the C-shape of the fixing portion body 4461, and the polarization plates 444P and 444A are fixed inside the space while being biased by a spring member 4465-with a predetermined gap secured therebetween.

Subsequently, while adjusting the outer shape position of the visual-angle corrector plate 443 with the positioning portion 4464A, a side of the visual-angle corrector plate 443 is adhered on the base 4464 by a heat-conductive tape or an adhesive and the panel-fixing plate 446 is fixed on the light-incident side of the cross dichroic prism 445.

Then, after an ultraviolet-curing adhesive is coated on the pin 4463 of the panel-fixing plate 446, the pin 4463 is inserted into the hole 4413 on the liquid crystal panel 441G while the adhesive is uncured.

In the same manner, the liquid crystal panels 441R and 441B are temporarily fixed on the panel-fixing plate 446 while the ultraviolet-curing adhesive is uncured, and the red, green and blue lights are introduced on the liquid crystal panels 441R, 441G and 441B. Then, while checking the respective color lights irritated from the light-irradiation side of the cross dichroic prism 445, the relative position of the liquid crystal panels 441R, 441G and 441B is adjusted, and, after completing the position adjustment, ultraviolet is irradiated on the ultraviolet-curing adhesive to fix the liquid crystal panels 441R, 441G and 441B.

(2-2) Structure of Control Board 5

As shown in FIGS. 4 and 5, the control board 5 is disposed to cover the upper side of the optical unit 4 and has a main board 51 having a two-stage structure including an upper board 511 on which a controller body such as a processor is installed and a lower board 512 on which driver ICs for the liquid crystal panels 441R, 441G and 441B are installed. Though not illustrated, the control board 5 also has an interface board that is connected on the rear side of the main board 51 and is vertically mounted along the rear sides 11D and 12D of the exterior case 2.

The connectors 15 are installed on the backside of the interface board and the image information inputted from the connectors 15 is outputted to the main board 51 through the interface board.

The processor on the main board 51 outputs a control command to the driver IC for the liquid crystal panel after processing the inputted image information. The driver IC generates a drive signal in accordance with the control command to drive the liquid crystal panel 441 to modulate the light beam in accordance with the image information to form the optical image.

(2-3) Structure of Power Supply Block 6

The power supply block 6 extends in a projection direction of the exterior case 2 of the projector 1 adjoining the optical unit 4, which includes a power supply unit and a lamp driver unit (not shown).

The power supply unit supplies the electric power supplied from the outside through a power cable connected with the above-described inlet connector 17 to the lamp driver unit and the control board 5 etc.

The lamp driver unit is a converter for supplying the electric power to the above-described light source 411 with a stable voltage. The commercial alternate-current inputted from the power supply unit is rectified and converted by the lamp driver unit to be supplied to the light source 411 as a direct-current or an alternate rectangular wave current.

As shown in FIG. 3, an exhaust fan 61 is provided on the front side of the power supply block 6, and the air having cooled the respective components inside the projector 1 is concentrated by the exhaust fan 61 and is discharged toward the outside of the apparatus from the opening 28 of the exterior case 2.

(2-4) Cooling Mechanism

Figure 9:
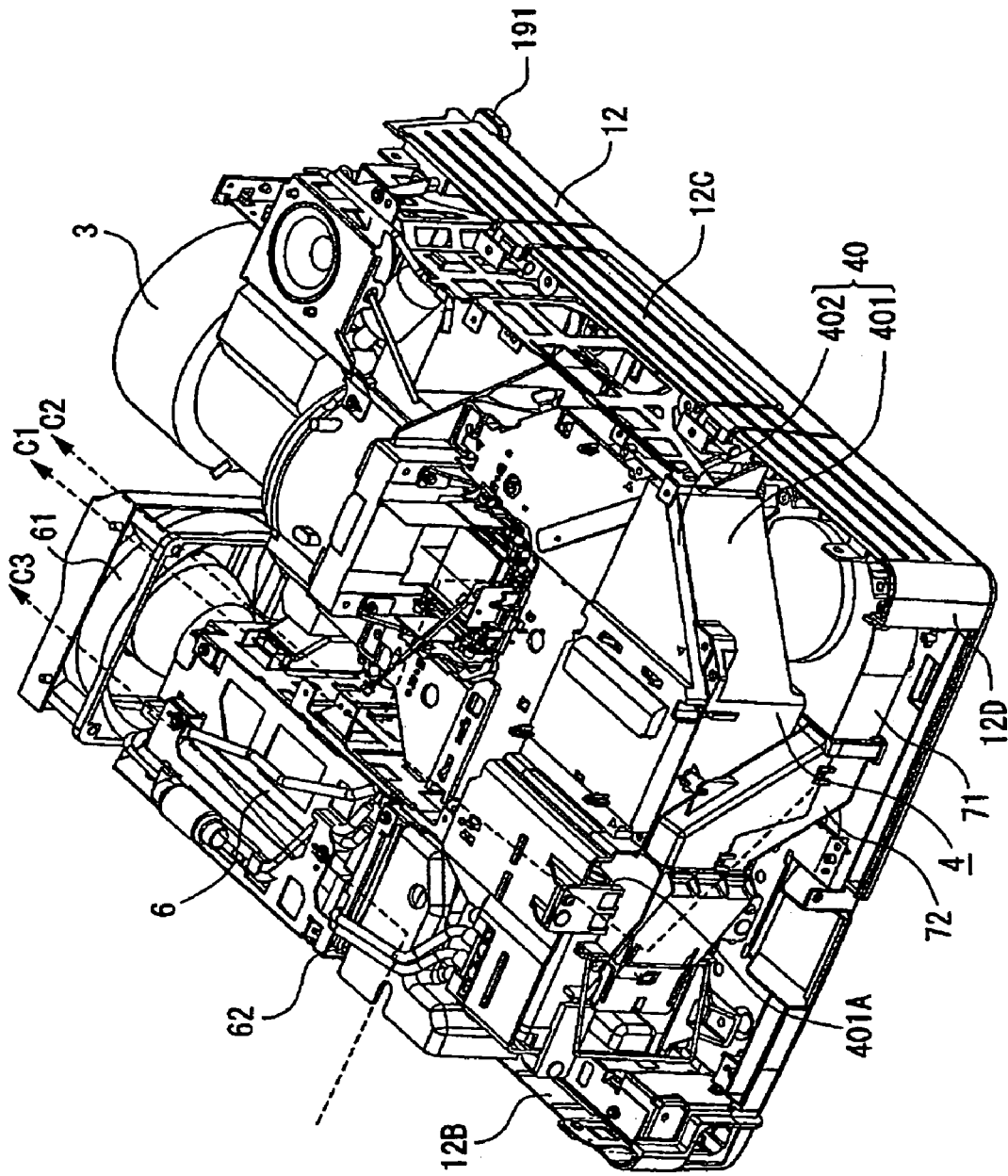
FIG. 9 is a perspective view showing cooling channels of the aforesaid embodiment.

Since the inside of the projector 1 is heated by the heat-generating light source 411 and the power supply block 6, a cooling air has to be circulated therein to efficiently cool the light source 411, the optical device 44 and the power supply block 6. Accordingly, three cooling channels C1, C2 and C3 are defined in the present embodiment as shown in FIG. 9.

The cooling channel C1 is a cooling channel for cooling the light source 411 and the polarization converter 415 of the integrator illumination optical system 41, which supplies the cooling air drawn in by a sirocco fan 71 provided inside the apparatus at the intake opening 24 shown in FIG. 2 to the light source 411 and the polarization converter 415 from a side of the light source housing portion 401A of the light guide 40 by a duct 72 to cool the light source 411 and the polarization converter 415. The air having cooled the components is drawn in by the exhaust fan 61 to be discharged toward the outside of the projector 1.

The cooling channel C2 is a cooling channel for cooling the optical device 44 that modulates the light beam and synthesizes the color lights, the cooling channel C2 supplying the cooling air drawn in by a sirocco fan (described below) provided inside the apparatus at the intake opening formed at a position where the filter 23 (FIG. 2) is provided from the lower side of the optical device 44 to the upper side thereof to cool the liquid crystal panels 441R, 441G and 441B, the incident-side polarization plate 442, the visual-angle corrector plate 443 and the irradiation-side polarization plate 444. The air having cooled the components flows along the lower side of the main board 51 and the upper side 11A of the upper case 11, which is discharged to the outside by the exhaust fan 61 while cooling the circuit elements installed on the main board 51.

The cooling channel C3 is a cooling channel for cooling the power supply block 6, which draws in the cooling air from the opening 112 formed on the lateral side 11B of the upper case 11 and the opening 122 formed on the lateral side 12B of the lower case 12 by an intake fan 62 provided on the rear end of the power supply block 6, a part of the drawn-in cooling air being supplied to the power supply unit and the lamp driver unit to be discharged to the outside by the exhaust fan 61 after cooling the components.

(2-5) Attitude Adjusting Mechanism of Reflection Mirror 424

Figure 10:
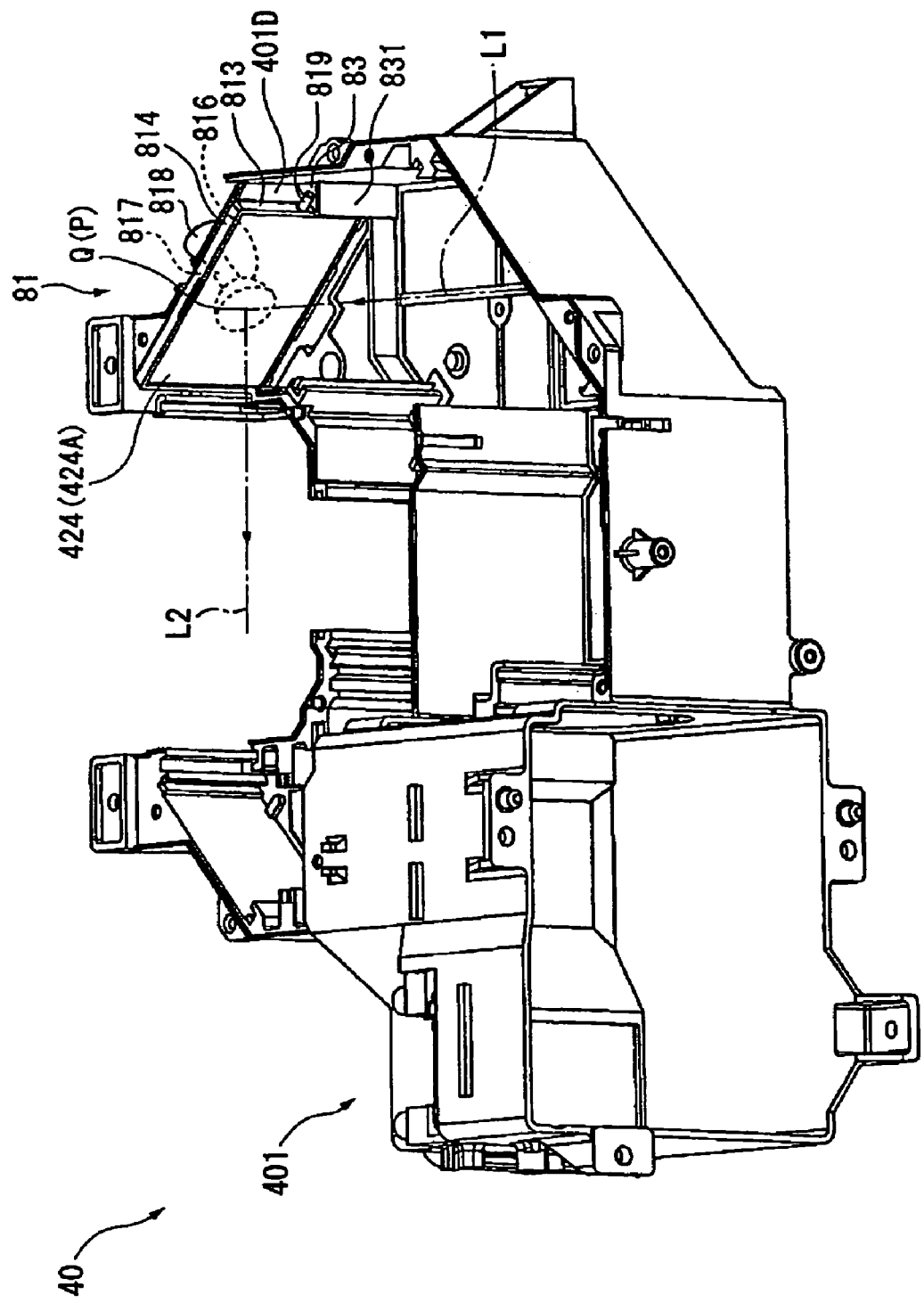
FIG. 10 is a perspective view showing the structure of the light guide housing the optical unit of the aforesaid embodiment.

As shown in FIG. 10, the reflection mirror 424 is held by a holder 81 that is rotated around a rotation center P relative to a sidewall 401D of the lower light guide 401. The rotation center P substantially coincides with an intersecting point Q of the defined illumination optical axis L1 and a reflection surface 424A of the reflection mirror 424. Incidentally, L2 represents an irradiation light illumination optical axis (i.e. an illumination optical axis of the light beam irradiated by the reflection surface 424A).

As shown in FIGS. 11 and 12(A) to (C), the holder 81 covers the reflection mirror 424, which includes a rear section 811, lateral sections 812 and 813, an upper section 814 and a lower section 815.

The reflection mirror 424 is held on the front side of the rear section 811 by heat-caulking of a caulking portion 814A provided on the upper section 814 and the lower section 815. The depth of the opening of the holder 81 is greater than the reflection mirror 424, so that the reflection surface 424A of the reflection mirror 424 is located inward relative to the surface position of the opening of the holder 81.

A bulging portion 816 is formed approximately at the center of the backside of the rear section 811, which is arranged as a part of a virtual sphere S having the rotation center P as the center thereof.

A mirror-position adjusting lever 817 as an arm projecting in the out-plane direction of the rear section 811 is provided on the top of the bulging portion 816, and a semi-spherical mirror knob 818 connected to an adjustment arm of an adjustment jig (not shown) is fixed on the distal end of the mirror-position adjusting lever 817 by heat-caulking.

Cylindrical projections 819 projecting along the surface of the reflection mirror 424 are provided on the lateral sections 812 and 813 so that a virtual line T connecting the central axes of the projections 819 passes the rotation center P.

A notch 812A is formed on the lower side of the lateral section 812. Accordingly, even after the reflection mirror 424 is attached to the holder 81, the reflection mirror 424 can be easily detached by inserting a jig having thin distal end into a space between the rear section 811 and the reflection mirror 424 from the notch 812A.

As shown in FIG. 11, a recess 82 for the bulging portion 816 to be engaged and a support surface 83 for supporting the projection 819 so that the rotation center P is located on a plane including the illumination optical axis L1 is provided on the sidewall 401D.

The recess 82 is formed in a shape corresponding to the spherical surface of the bulging portion 816 so that the bulging portion 816 can be smoothly pivoted. A hole 821 for exposing the mirror-position adjusting lever 817 to the outside of the lower light guide 401 is provided on top of the recess 82.

The hole 821 is formed in a circle with the upper part thereof being cut, the cut portion being a notch 822 opening toward the upper side of the sidewall 401D. Accordingly, the mirror-position adjusting lever 817 can be inserted from the upper side of the sidewall 401D to engage the bulging portion 816 on the recess 82, thereby improving the workability therefor.

A constricted portion 823 is provided at the connection of the hole 821 and the notch 822. Accordingly, the position shift of the bulging portion 816 toward the upper side during the pivotal movement of the bulging portion 816 caused on account of the notch 822 can be restrained.

The support surface 83 is provided on the upper side of a shoulder portion 831 and formed in a planar shape having small friction coefficient. Accordingly, the projection 819 can be smoothly rotated and slid.

The adjustment of the attitude of the reflection mirror 424 relative to the lower guide 401, in other words, the irradiation light illumination optical axis L2 is adjusted by introducing a light beam into the light guide 40 and checking the light beam irradiated from the projection lens 3.

Specifically, after disposing the light source 411 and the respective optical components in the lower light guide 401, a base resin of an instant adhesive is coated on the bulging portion 816 or the recess 82 and the mirror-position adjusting lever 817 is inserted from the upper side of the notch 822 while the instant adhesive is uncured. As shown in FIGS. 12(A) to (C), after engaging the bulging portion 816 on the recess 82 and resting the projection 819 on the support surface 83, the upper light guide 402 is attached and a light beam is irradiated on the reflection surface 424A along the defined illumination optical axis L1.

In this state, after an adjustment arm of an adjustment jig is attached on the mirror knob 818 while applying a tensile force, the mirror-position adjustment lever 817 is operated by the adjustment jig to pivotally move the holder 81 by pivotally moving the bulging portion 816 on the surface of the recess 82 in vertical and horizontal directions, and by sliding or rotating the projection 819 on the support surface 83 to adjust the attitude of the reflection mirror 424.

For instance, when the mirror-position adjusting lever 817 is moved in X11 direction as shown in FIG. 12(A), the bulging portion 816 pivotally moves along the surface of the recess 82 and the projection 819 slides on the support surface 83 in X12 direction around the rotation center P on the virtual line T. Accordingly, the holder 81 is rotated in left direction around the rotation center P.

Further, when the mirror-position adjusting lever 817 is moved in Z11 direction as shown in FIG. 12(B), the bulging portion 816 pivotally moves along the surface of the recess 82, so that the projection 819 is turned on the support surface 83 in Z12 direction around the virtual line T passing the rotation center P. Accordingly, the holder 81 is vertically rotated around the rotation center P.

When the mirror-position adjusting lever 817 is moved in X21 direction or Z21 direction, the holder 81 is rotated rightward or downward around the rotation center P in the same manner as described above.

After adjusting the attitude of the reflection mirror 424, i.e. the irradiation light illumination optical axis L2, by pivotally moving the holder 81 in the same manner as described above while checking the light beam irradiated by the projection lens 3, a hardening accelerator is coated on the portion where the base resin of the instant adhesive is coated to bond the bulging portion 816 and the recess 82 and an adhesive is coated on the portion where the projection 819 touches the support surface 83 through a hole (not shown) formed on the upper light guide 402 to bond the projections 819 and the support surface 83 to fix the reflection mirror 424 after the position thereof being adjusted.

According to the present embodiment, following advantages can be obtained.

Since the bulging portion 816 is formed on the backside of the holder 81 holding the reflection mirror 424 and the bulging portion 816 pivotally moves on the inner surface of the sidewall 401D, the rotation center P of the holder 81 being substantially coincident with the intersecting point Q of the illumination optical axis L1 and the reflection surface 424A of the reflection mirror 424, the displacement of the irradiation light illumination optical axis L2 when the holder 81 is rotated by a predetermined angle while the light bean is incident on the reflection mirror 424 along the illumination optical axis L1 becomes smaller than an arrangement where the rotation center P is not substantially coincident with the intersecting point Q.

Accordingly, the irradiation light illumination optical axis L2 can be easily and accurately adjusted.

Since the bulging portion 816 is formed as apart of the virtual sphere S and the center of the virtual sphere S is made substantially coincident with the rotation center P of the holder 81, the bulging portion 816 can be smoothly pivoted on the inner surface of the sidewall 401D.

Accordingly, the irradiation light illumination optical axis L2 can be more accurately adjusted by smoothly rotating the holder 81.

Since the recess 82 is formed at a position corresponding to the pivoting surface of the bulging portion 816 on the inner surface of the sidewall 401D, the position of the bulging portion 816 can be determined relative to the sidewall 401D by engaging the bulging portion 816 with the recess 82.

Accordingly, the position shift of the rotation center P when the holder 81 is rotated can be restrained as compared to an arrangement without the recess 82.

Since the mirror-position adjusting lever 817 projecting in the out-plane direction of the rear section 811 is provided on the top of the bulging portion 816 and a hole 821 that allows the projection of the mirror-position adjusting lever 817 is formed on the sidewall 401D, the bulging portion 816 can be pivoted from the outside, in other words, the holder 81 can be rotated even after the lower light guide 401 is closed with a cover.

Accordingly, the holder 81 can be rotated without providing any special dust-proof measures for the optical components housed in the light guide 40.

Especially, since the mirror knob 818 connected to an adjustment arm of an adjustment jig through the mirror-position adjusting lever 817 is provided on the top of the bulging portion 816, the rotation of the holder 81 can be more accurately controlled with the use of the adjustment arm. In other words, since the irradiation light illumination optical axis L2 can be more accurately adjusted and the margin relative to the effective illumination range can be reduced, the effective illumination can be increased and the brightness can be enhanced.

Since the pair of projections 819 projecting along the surface of the reflection mirror 424 so that the virtual line T connecting the central axes of the respective projections passes the rotation center P of the holder 81 are provided on the lateral sides 812 and 813 of the holder 81 and the support surface 83 for supporting the projections 819 so that the rotation center P of the holder 81 is located on a plane including the illumination optical axis L1, when the holder 81 is rotated in right and left directions, the projection 819 is slid on the support surface 83 around the rotation center P on the virtual line T and, when the holder 81 is vertically rotated, the projection 819 is turned on the support surface 83 around the virtual line T passing through the rotation center P.

Accordingly, by providing the projections 819 and the support surface 83, the downward shift of the rotation center P on account of the self-weight of the holder 81 can be restrained as compared to an arrangement without providing the projections 819 and the support surface 83.

Especially, since the projection 819 has a cylindrical configuration, the projection 819 is smoothly rotated on the support surface 83, so that the vertical rotation of the holder 81 can be more smoothly conducted.

Further, by supporting the projection 819 on the support surface 83, the holder 81 can be temporarily set on the lower light guide 401. Accordingly, the installation process and the attitude-adjusting process of the holder 81 can be independently conducted, so that the attitude adjusting process can be efficiently conducted.

Incidentally, the scope of the present invention is not restricted to the above-described embodiments, but includes modifications and improvements as long as an object of the present invention can be achieved.

Though both of the bulging portion 816 and the recess 82 are spherical in the above embodiment, similar function and advantage can be obtained as long as either one of the components has spherical surface.

Though the attitude of the reflection mirror 424 can be adjusted in the above embodiment, the attitude of the reflection mirrors 421, 432 and 434 may be adjustably arranged.

Though a total-reflection mirror is used for the reflection mirrors 421, 424, 432 and 434, a wavelength-selection mirror may be used.

Though the attitude of the reflection mirror 424 installed in the projector 1 is adjusted in the above embodiment, the same arrangement may be used in a reflection mirror or a wavelength-selection mirror provided in the other optical apparatus and electronics.

Specific structure and shape in implementing the present invention may be designed as desired as long as an object of the present invention can be achieved.

What is claimed is:

1. An optical component casing that houses a plurality of optical components including a reflection mirror and disposes the plurality of optical components on a planarly defined illumination optical axis, the casing comprising:
   a holder that holds the reflection mirror;
   a housing main body that houses the optical components other than the reflection mirror; and
   a bulging portion bulging in an out-plane direction of the reflection mirror, the bulging portion being provided on a side opposite to a side of the holder on which the reflection mirror is provided,
   wherein the bulging portion is affixed to an arm whose pivotal movement pivotally moves the bulging portion on an inner surface of the housing main body in conjunction with the arm to rotate the holder relative to the housing main body, and
   wherein the rotation center of the holder is substantially coincident with the intersecting point of the planarly defined illumination optical axis and a reflection surface of the reflection mirror.

2. The optical component casing according to claim 1, wherein the bulging portion is comprised as a part of a sphere and the rotation center of the holder is substantially coincident with the center of the sphere.

3. The optical component casing according to claim 1, wherein a recess is formed on the inner surface of the housing main body at a position corresponding to the pivoting surface of the bulging portion.

4. The optical component casing according to claim 1,
   wherein the arm projects in the out-plane direction of the holder and is provided on the top of the bulging portion, and
   wherein a hole that receives the projection of the arm is formed on the housing main body.

5. The optical component casing according to claim 1,
   wherein a pair of projections projecting along a surface of the reflection mirror are provided on both ends of the holder orthogonal to a plane including the illumination optical axis,
   wherein the pair of projections are formed at a position where a line connecting the central axes of the pair of projections passes the rotation center of the holder, and
   wherein a support surface that supports the pair of projections so that the rotation center of the holder is located on a plane including the illumination optical axis is formed on the inner surface of the housing main body.

6. An optical device that separates a light beam irradiated by a light source into a plurality of color lights, comprising:
   the optical component casing according to claim 1; and
   a plurality of mirrors housed in the optical component casing,
   wherein the plurality of mirrors includes a total reflection mirror that reflects all of the light and a wavelength-selection mirror that transmits a light of a predetermined wavelength and reflects the rest of the light, and
   wherein the total reflection mirror or the wavelength-selection mirror is attached to the holder.

7. A projector that modulates a light beam irradiated by a light source in accordance with image information to form an optical image, the optical image being projected in an enlarged manner, comprising:
   the optical device according to claim 6.

8. The projector according to claim 7, wherein the bulging portion is comprised as part of a sphere and the rotation center of the holder is substantially coincident with the center of the sphere.

9. The projector according to claim 7, wherein a recess is formed on the inner surface of the housing main body at a position corresponding to the pivoting surface of the bulging portion.

10. The projector according to claim 7, wherein the arm projects in the out-plane direction of the holder and is provided on the top of the bulging portion, and
    wherein a hole that receives the projection of the arm is formed on the housing main body.

11. The projector according to claim 7,
    wherein a pair of projections projecting along a surface of the reflection mirror are provided on both ends of the holder orthogonal to a plane including the illumination optical axis,
    wherein the pair of projections are formed at a position where a line connecting the central axes of the pair of projections passes the rotation center of the holder, and
    wherein a support surface that supports the pair of projections so that the rotation center of the holder is located on a plane including the illumination optical axis is formed on the inner surface of the housing main body.

* * * * *